No. 721,497. PATENTED FEB. 24, 1903.
G. H. BIGELOW.
NUT LOCK.
APPLICATION FILED JUNE 18, 1902.
NO MODEL.
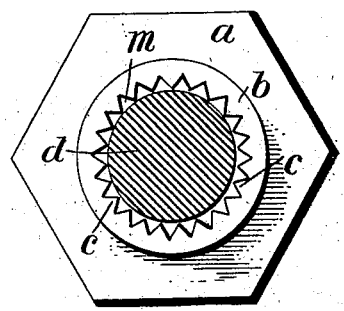
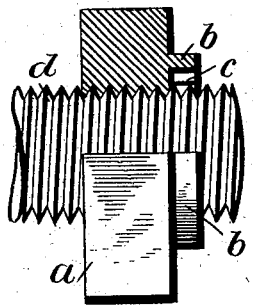
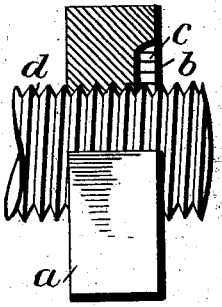
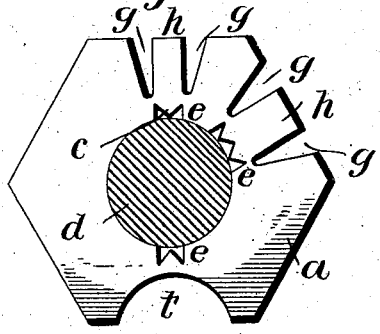
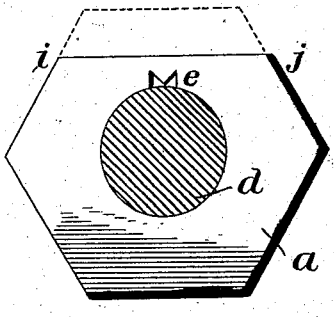
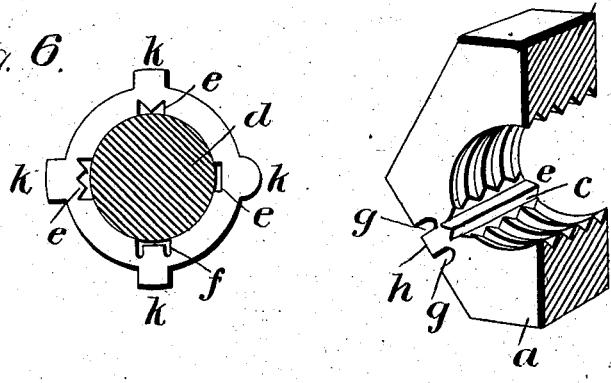
Inventor
G. H. Bigelow.
Witnesses
By
Attorneys

UNITED STATES PATENT OFFICE.

GEORGE HEFFLAND BIGELOW, OF AUCKLAND, NEW ZEALAND.

NUT-LOCK.

SPECIFICATION forming part of Letters Patent No. 721,497, dated February 24, 1903.

Application filed June 18, 1902. Serial No. 112,258. (No model.)

*To all whom it may concern:*

Be it known that I, GEORGE HEFFLAND BIGELOW, a citizen of the United States, residing at Auckland, in the Colony of New Zealand, have invented certain new and useful Improvements in Nut-Locks; and I do hereby declare the following to be a full, clear, and exact description of the invention, such as will enable others skilled in the art to which it appertains to make and use the same.

My invention relates to nut-locks; and it consists in so making the ordinary nut that by percussion or compression on parts of it the nut will not become loose or unscrew through vibration of the bolt. To this end I cut one or more grooves or channels of the required depth, size, and length on the inner threaded side of the nut transversely to the threads and parallel to the bolt, so that an angular ridge or ridges may be formed between the grooves or channels to be just clear of the threads and not to interfere with the screwing of the nut on the bolt. On the outer side of the nut I also cut a channel, channels, or grooves of suitable depth and size opposite to the inner channels or grooves, leaving between each groove or channel a ridge, as shown in the accompanying drawings, which form part of this specification.

In the drawings, Figure 1 is an end view, partly in section, showing one form of my invention embodied in a nut-lock screwed upon a bolt. Fig. 2 is a side elevation of the same, partly in section. Fig. 3 is a similar view of the same, showing a modified construction. Fig. 4 shows a modified form of the invention embodied in a nut of somewhat different construction. Fig. 5 is a modified construction of the form shown in Fig. 4. Fig. 6 is an end view of a bolt having a nut screwed thereon embodying the features shown in Fig. 4 in somewhat different form; and Fig. 7 is a detail view, partly in section, showing the transverse ridge extending across and below the threads of the nut.

When the nut is screwed home to its place, the outer ridge is compressed in such a manner and in such a way as to cause the inner angular pointed ridge or tooth to embed itself in the threads of the bolt transversely, and thus lock the nut.

Another method is to have one or more channels or grooves *m* cut, pressed, or molded on the inner side of the nut transversely to the threads, as above described, and preferably to the same depth to be just clear of the threads of the bolt, with the thickness of the nut reduced on its outer side opposite the inner channel in any way that may be found best, as shown at *g g*, Figs. 4 and 7, and *i j*, Fig. 5, but preferably two grooves, so as to leave a ridge *h*, as shown at Figs. 4 and 7. This projection or ridge can easily be struck with a hammer or pressed with a screw-vise, and the unthreaded channel or groove on the inner side of the nut will be thereby forced or depressed down tightly on and into the threads of the bolt, thus locking the nut.

Both of these methods can either be applied to the ordinary nut or to a nut with a projecting lip or flange, as shown in Figs. 1, 2, and 3, which may or may not be threaded. Fig. 7 being a fragment of a nut shows more clearly the grooves *e* and *g g*, leaving an inside ridge *c* and an outside rige *h*.

The channels or grooves either inside or outside the nut may or may not extend through the whole width of the nut.

What I claim as my invention, and desire to secure by Letters Patent, is—

1. A nut-lock comprising a screw-threaded nut, having a reduced or cut-away portion in its periphery, and one or more ridges formed in the threaded portion of the nut opposite said reduced portion, whereby compression upon said nut adjacent said reduced portion will force said transverse ridge into the threads upon the bolt.

2. A nut-lock comprising an internally-screw-threaded nut, a pointed ridge formed in the bore of said nut and extending transversely across and below said screw-threads, and an abutment formed in line with said ridge adapted to receive the blow of a hammer to embed said ridge into the screw-threads upon the bolt.

3. A nut-lock comprising a threaded nut having one or more ridges formed in the bore of said nut disposed transversely to and immediately below the threads thereof, said ridge or ridges having a pointed surface adapted to be embedded into the threads upon the bolt.

4. A nut-lock comprising a screw-threaded nut, having a ridge formed in the bore thereof extending transversely to and immediately below the screw-threads of the nut, said ridge having a sharp surface adapted to be embedded in the threads upon the bolt, and a reduced or cut-away portion formed in said nut in proximity to said ridge.

5. A nut-lock comprising an internally-screw-threaded nut having a ridge formed in the bore thereof, said ridge being disposed transversely to and depressed below said threads, and means for weakening said nut in proximity to said ridge to facilitate the embedding of said ridge into the threads of the bolt.

In testimony whereof I affix my signature in presence of two witnesses.

GEORGE HEFFLAND BIGELOW.

Witnesses:
　JOSEPH JAMES MACKY,
　JAMES WILSON.